United States Patent
Ueno et al.

(10) Patent No.: US 7,859,693 B2
(45) Date of Patent: Dec. 28, 2010

(54) PRINTING SYSTEM WITH POWER SAVING MODE

(75) Inventors: Takuhito Ueno, Minato-ku (JP); Masahiko Kikuchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1170 days.

(21) Appl. No.: 09/975,250

(22) Filed: Oct. 12, 2001

(65) Prior Publication Data

US 2002/0109857 A1    Aug. 15, 2002

(30) Foreign Application Priority Data

Feb. 15, 2001    (JP)    ............................ 2001-038070

(51) Int. Cl.
*G06K 15/00* (2006.01)
*G06F 3/12* (2006.01)
*B41J 29/38* (2006.01)
*G06F 1/00* (2006.01)

(52) U.S. Cl. .................... 358/1.14; 358/1.15; 347/5; 713/323; 713/324

(58) Field of Classification Search ............... 358/1.14, 358/1.15, 1.16; 713/300, 320, 322, 323
See application file for complete search history.

(56) References Cited

U.S. PATENT DOCUMENTS

| | | | | |
|---|---|---|---|---|
| 5,550,637 A * | 8/1996 | Murakami | .................. | 358/296 |
| 5,581,668 A * | 12/1996 | Oida et al. | .................. | 358/1.14 |
| 5,825,993 A * | 10/1998 | Shimura et al. | ............ | 358/1.16 |
| 5,881,335 A * | 3/1999 | Yang | ........................... | 399/70 |
| 5,933,581 A * | 8/1999 | Miyazaki et al. | ........... | 358/1.14 |
| 5,937,148 A * | 8/1999 | Okazawa | ................... | 358/1.13 |
| 6,084,934 A * | 7/2000 | Garcia et al. | ................ | 375/370 |
| 6,091,515 A * | 7/2000 | Kimura | ....................... | 358/434 |
| 6,094,546 A * | 7/2000 | Nakazato et al. | ................ | 399/1 |
| 6,100,995 A * | 8/2000 | Itoh | ............................ | 358/1.16 |
| 6,134,401 A * | 10/2000 | Yun et al. | ....................... | 399/70 |
| 6,233,226 B1 * | 5/2001 | Gringeri et al. | ............. | 370/252 |
| 6,260,151 B1 * | 7/2001 | Omizo et al. | ................ | 713/324 |
| 6,268,925 B1 * | 7/2001 | Yamanaka | .................. | 358/1.14 |
| 6,542,253 B1 * | 4/2003 | Kim | ........................... | 358/1.15 |
| 6,594,027 B1 * | 7/2003 | Guillemin et al. | ........... | 358/1.12 |
| 6,594,767 B1 * | 7/2003 | Wiley et al. | .................. | 713/300 |
| 6,636,327 B2 * | 10/2003 | Yoshida et al. | ............. | 358/1.15 |
| 6,701,372 B2 * | 3/2004 | Yano et al. | ................... | 709/232 |
| 6,742,130 B1 * | 5/2004 | Kawase | ....................... | 713/300 |

(Continued)

FOREIGN PATENT DOCUMENTS

JP    A-7-237338    9/1995

(Continued)

*Primary Examiner*—Edward L Coles
*Assistant Examiner*—Vincent Rudolph
(74) *Attorney, Agent, or Firm*—Oliff & Berridge, PLC

(57) ABSTRACT

In a printing system 10 connected to a host computer 20 as an upper system via a serial bus, communication control information used in a shift from a power saving mode to a normal transfer mode are previously in a response controlling portion 147 before a CPU 151 in a printing controlling portion 12 is shifted into the power saving mode, and then the response controlling portion 147 can receive the data based on the set communication control information without intervention of a CPU 151 in the cancel of the power saving mode.

10 Claims, 7 Drawing Sheets

U.S. PATENT DOCUMENTS

| | | | |
|---|---|---|---|
| 6,813,037 B1 * | 11/2004 | Collard | 358/1.15 |
| 6,977,945 B1 * | 12/2005 | Noda et al. | 370/468 |
| 7,054,019 B1 * | 5/2006 | Simpson | 358/1.15 |
| 7,057,754 B1 * | 6/2006 | Tsuchiya et al. | 358/1.15 |
| 2002/0041389 A1 * | 4/2002 | Noda | 358/1.14 |

FOREIGN PATENT DOCUMENTS

| | | |
|---|---|---|
| JP | A-8-149159 | 6/1996 |
| JP | A 9-326831 | 12/1997 |
| JP | A-9-331370 | 12/1997 |
| JP | A 10-56526 | 2/1998 |
| JP | A-2002-103741 | 4/2002 |

* cited by examiner

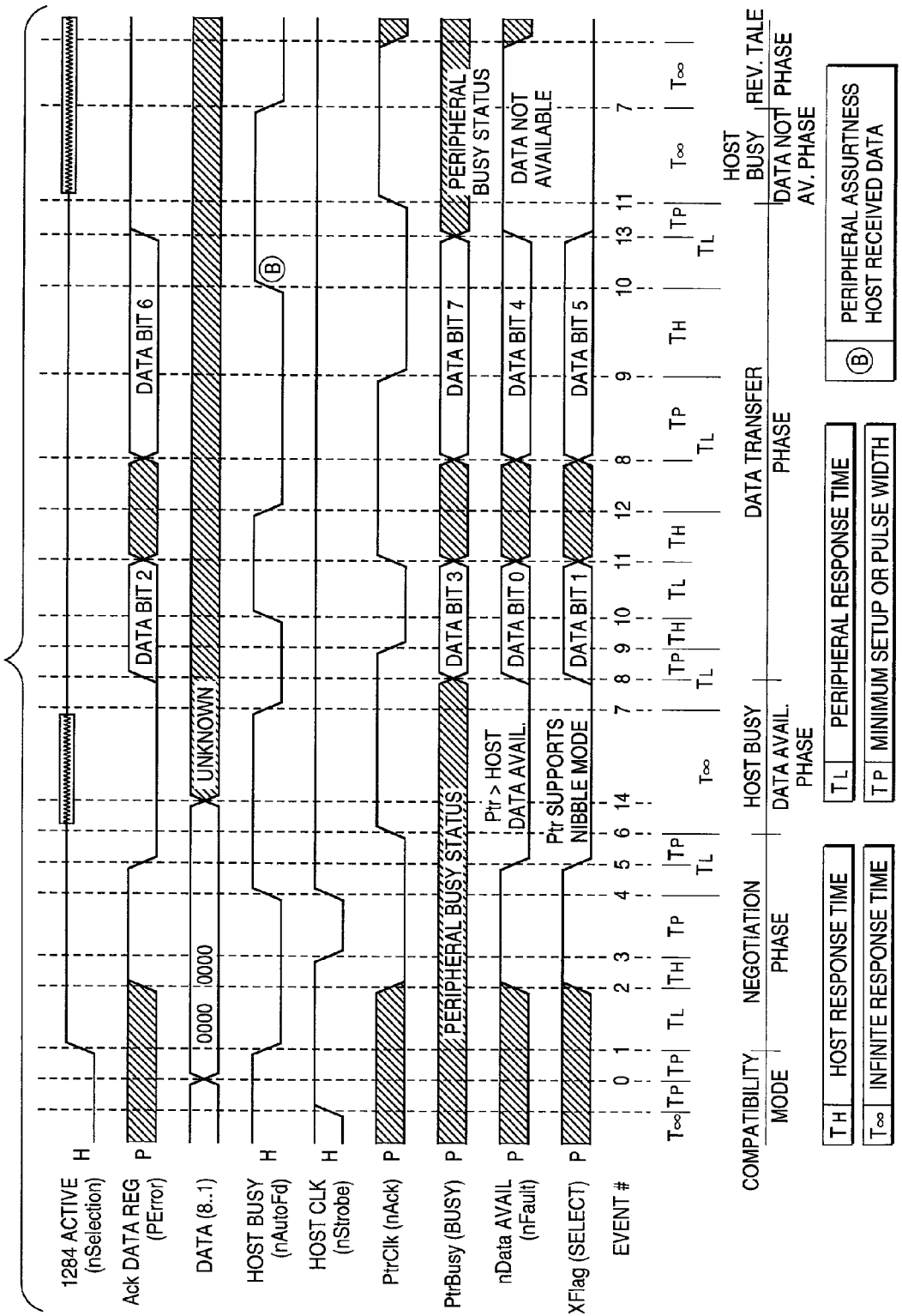

PRINTING SYSTEM WITH POWER SAVING MODE

BACKGROUND OF THE INVENTION

1. Technical Field

The present invention relates to a printing system for receiving print data transmitted from an upper system to execute a printing process and, more particularly, a printing system having a power-saving mode that can save the power (energy) by stopping the power source and the clock supplied to a printing portion, a controlling portion, etc. in the standby state in which no printing process is executed.

2. Related Art

In the prior art, as the system of this type, it has been well known the system employing the system that the power supply of the system is turned ON while asserting the first output control signal (busy signal) when the receiving operation is started in the power-saving mode, and then the busy signal is negated when the initialization is completed (see Patent Application Publication (KOKAI) Hei 10-56526, for example). In other words, the receiving operation from the parallel interface is stopped once by asserting the busy signal, and then the receiving operation is started again by negating the busy signal at the stage when the receiving preparation is completed by turning ON the power supply of the system.

Problems to be Solved

However, in the above prior art, first the CPU of the controlling portion for controlling the overall system executes the building-up process at the time of returning from the power-saving mode, and then the operation is shifted to the receiving operation. For this reason, it may be considered such a situation that, if a time required for a building-up process of CPU is long, a return time from the power-saving mode to the normal mode (normal transfer mode) exceeds a time-out time of the data transmission on the upper system side, e.g., the host computer side, to thus cause the transmission error.

At that time, since the process to transmit the data once again, to interrupt temporarily the transmission, or the like is carried out on the host computer side, there is the problem that the data transfer efficiency is extremely lowered. Also, according to this, there is the possibility that a time required to start the printing when the receiving operation is started in the power-saving mode, i.e., FPOT (First Print Out Time) is increased extremely.

SUMMARY OF THE INVENTION

The present invention has been made in view of the above subjects, and it is an object of the present invention to provide a printing system capable of avoiding the generation of the time-out error on the upper system side and also enabling the optimization of FPOT, in shifting the mode from the power-saving mode to the normal mode even when a time required for a building-up process of CPU is long.

Means for Solving the Problems

A printing system of the present invention including a printing portion and a controlling portion for controlling the printing portion, and having a power saving mode for stopping a supply of a power source to at least the controlling portion, the printing system comprising a deciding portion for deciding a shift from a normal mode to the power saving mode, a setting portion for setting communication control information used in the shift from the power saving mode to the normal mode after the shift to the power saving mode is decided by the deciding portion, and a receiving portion for receiving data based on the communication control information set by the setting portion in the shift from the power saving mode to the normal mode not to use the controlling portion.

In the printing system having the above configuration, when the shift from the normal mode to the power saving mode is decided by the deciding portion, the setting portion sets the communication control information used in the shift from the power saving mode to the normal mode in response to this. Then, the receiving portion can receive the data based on the communication control information previously set by the setting portion without the intervention of the controlling portion in the shift from the power saving mode to the normal mode.

A printing system of the present invention including a printing portion and a controlling portion for controlling the printing portion, and having a power saving mode for stopping a supply of a power source to at least the controlling portion, the printing system comprising a storing portion for storing received data, a deciding portion for deciding a receiving speed based on a returning time from the power saving mode to a normal mode and a capacity of the storing portion, and a receiving portion for receiving data based on the receiving speed decided by the deciding portion in a shift from the power saving mode to the normal mode to store the data in the storing portion.

In the printing system having the above configuration, first the deciding portion decides the receiving speed of the data based on the returning time from the power saving mode and the capacity of the storing portion. Then, in the shift from the power saving mode to the normal mode, the receiving portion receives the data based on the receiving speed previously decided by the deciding portion and then stores the received data in the storing portion.

BRIEF DESCRIPTION OF THE DRAWINGS

FIG. 8 is a transition timing chart from a compatible mode to a negotiation phase of a parallel interface based on IEEE1284.

DETAILED DESCRIPTION OF THE PREFERRED EMBODIMENTS

Embodiments of the Invention

Embodiments of the present invention will be explained in detail with reference to the drawings hereinafter.

First Embodiment

Figure 1:
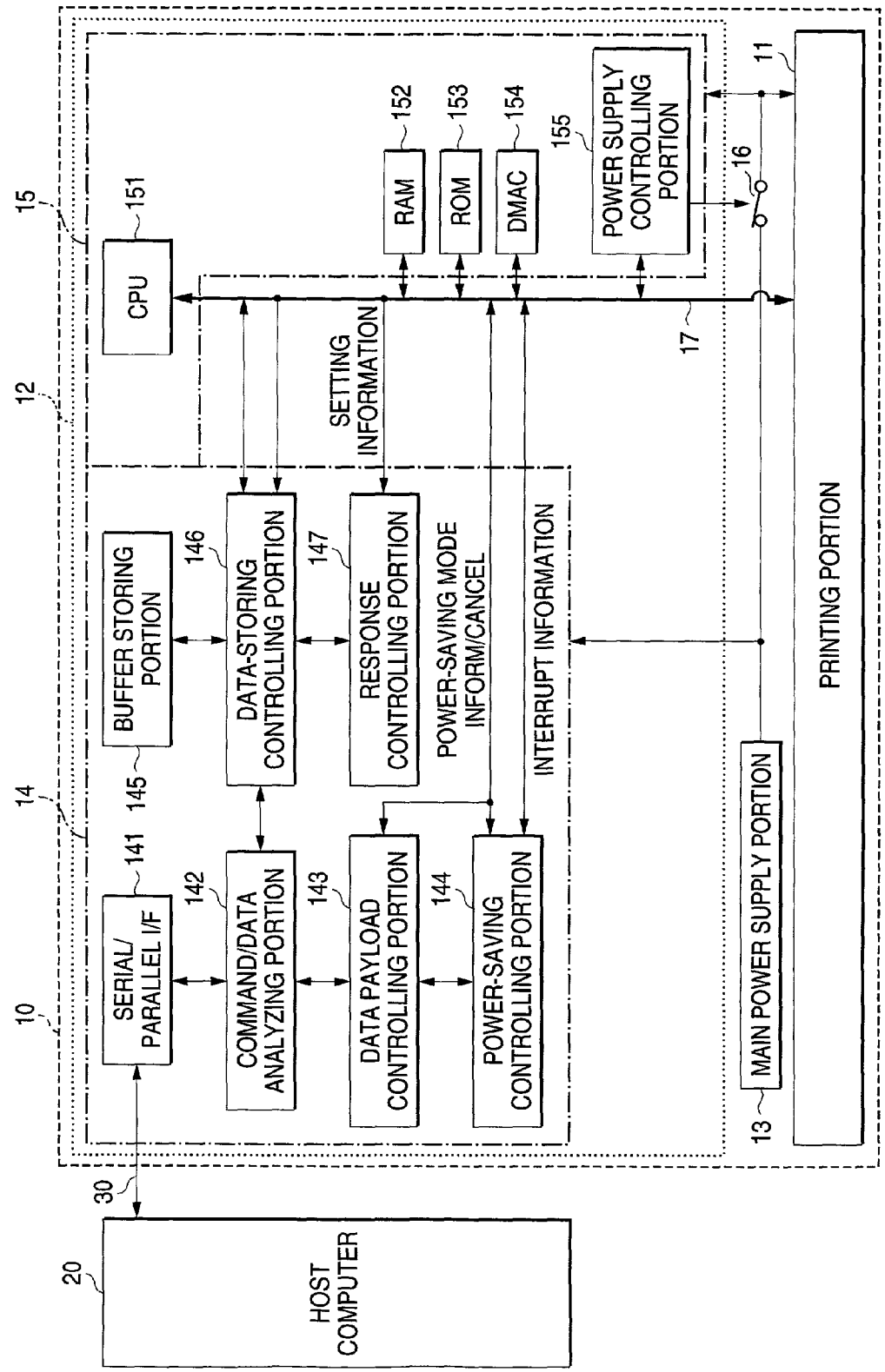
FIG. 1 is a block diagram showing an outline of a configuration of a printing system according to a first embodiment of the present invention.

FIG.1 is a block diagram showing an outline of a configuration of a printing system according to a first embodiment of the present invention. In FIG.1, a printing system 10 of the present embodiment is constructed such that such printing system comprises a printing portion 11, a print controlling portion 12 for controlling the printing portion 11, and a main power supply portion 13, and is connected to a host computer 20 as an upper system, for example, via a serial bus 30 to transmit/receive the serial data to/from the host computer 20.

The print controlling portion 12 is constructed such that such print controlling portion has a communication I/F (interface) 14 for executing the communication with the host computer 20 via a serial bus 30, and a controlling portion 15 for controlling the overall present system, and the power source is directly supplied from the main power supply portion 13 to the communication I/F (interface) 14, and also the power source is selectively supplied to the printing portion 11 and the controlling portion 15 via a power supply switch 16.

In this print controlling portion 12, the communication I/F 14 has a configuration that has a serial/parallel I/F 141, a command/data analyzing portion 142, a data payload controlling portion 143, a power-saving controlling portion 144, a buffer storing portion 145, a data-storing controlling portion 146, and a response controlling portion 147. In this communication I/F 14, the serial/parallel I/F 141 executes an action to convert the serial data received from the host computer 20 into the parallel data and also convert the parallel data processed in own device into the serial data.

The command/data analyzing portion 142 analyzes the command in the data received from the host computer 20 and the data contents. As an example, this command/data analyzing portion 142 executes the decision whether or not the data is directed to own device, by looking up the address area in the packet. Where the packet signifies the unit in which the information are arranged to have a predetermined size. Then, the data block to be transmitted, i.e., the frame is constructed by sets of the packets (packet group)

The data payload controlling portion 143 controls the data payload from the host computer 20 per one packet. The power-saving controlling portion 144 issues appropriately a power-saving mode shift authorization response signal for permitting the shift from the normal transfer mode (normal mode) to the power-saving mode, a power-saving mode cancel informing signal, and an interrupt informing signal to the CPU 151.

The data received from the host computer 20 are stored in the buffer storing portion 145 under the control of the data-storing controlling portion 146. The communication control information indicating what response should be made to the data received from the host computer 20 in the shift from the power-saving mode to the normal transfer mode are set previously in the response controlling portion 147 under the control of the CPU 151.

Here, as the communication control information, for example, there may be listed the information as to a predictive time required until the process in the print controlling portion 12 can be started after the CPU 151 returns from the power-saving mode to the normal transfer mode and completes the boot process, a storing amount (capacity) of the buffer storing portion 145, the maximum data payload form the host computer 20 per one packet, a reply rates of the ACK response and the NAK response to the data received from the host computer 20, etc. These communication control information may be set arbitrarily.

The controlling portion 15 is constructed such that such controlling portion has the CPU 151, a RAM 152, a ROM 153, a DMAC 154 for executing the DMAC (Direct Memory Access Controller) transfer, and a power supply controlling portion 155, and is connected mutually to the communication I/F 14 via the parallel bus 17. In this controlling portion 15, the DMAC 154 issues a DMA transfer authorization signal to the data-storing controlling portion 146 when the CPU 151 completes the boot process.

The power supply controlling portion 155 is provided to control ON(close)/OFF(open) of the power supply switch 16 that supplies/stops the power supply voltage to the printing portion 11 and the controlling portion 15. The power supply controlling portion 155 stops the power source to the printing portion 11 and the controlling portion 15 by turning OFF the power supply switch 16 in response to this when the power-saving mode shift authorization response signal is issued from the power-saving controlling portion 144, and also supplies the power source to the printing portion 11 and the controlling portion 15 by turning ON the power supply switch 16 in response to this when the power-saving mode cancel informing signal issued from the power-saving controlling portion 144.

Next, an operation of the printing system 10 having the above configuration according to the first embodiment will be explained in compliance with a flowchart in FIG.2 hereunder. Here, controlling procedures in the shift from the normal transfer mode to the power-saving mode and then to the normal transfer mode in response to the power-saving mode canceling information will be explained.

In the state that the normal transfer mode is set (step S101), when the print controlling portion 12 is not receiving the data addressed to own system from the host computer 20, such print controlling portion 12 monitors the request for the shift to the power-saving mode issued from the CPU 151 (the issue of the power-saving mode shift authorizing response signal) (step S102). The CPU 151 sets previously the communication control information, that indicates what response should be made to the data received from the host computer 20 in the shift from the power-saving mode to the normal transfer mode, in the response controlling portion 147 (step S103).

When the setting of the communication control information to the response controlling portion 147 is completed under the control of the CPU 151 (step S104), the power-saving controlling portion 144 issues the power-saving mode shift authorization response signal to the power supply controlling portion 155 (step S105). When the power supply controlling portion 155 receives the power-saving mode shift authorization response signal, it stops the power source supply to the printing portion 11 and the controlling portion 15, i.e., the CPU 151, the RAM 152, the ROM 153, and the DMAC 154, by turning OFF the power supply switch 16. As a result, the operation mode is shifted to the power-saving mode.

In the power-saving mode, the serial/parallel I/F 141 and the command/data analyzing portion 142 always monitor the contents of the data from the host computer 20, i.e., whether or not the data addressed to own system is detected (step S106). The data addressed to own system is decided by looking up the address area in the packet. If the serial/parallel I/F 141 and the command/data analyzing portion 142 receive the data addressed to own system from the host computer 20, the power-saving controlling portion 144 issues the power-saving mode cancel informing signal to the power supply controlling portion 155 and also issues the interrupt informing signal to the CPU 151 in response to this (step S107).

When the power supply controlling portion 155 receives the power-saving mode cancel informing signal, it starts the power source supply to the printing portion 11 and the controlling portion 15 by turning ON the power supply switch 16. When the power supply is supplied to the CPU 151, first this CPU 151 executes the boot process. During the boot process of the CPU 151, the response controlling portion 147 executes the communication with the host computer 20 in accordance with the communication control information stored therein (step S108). Also, the response controlling portion 147 monitors the reception of the DMA transfer authorization signal from the DMAC 154 (step S109). In this case, the details of the setting operation of the communication control information will be described later.

When the CPU 151 finishes the boot process, the DMAC 154 issues the DMA transfer authorization signal to the data-storing controlling portion 146 in response to this. When the data-storing controlling portion 146 receives the DMA transfer authorization signal from the DMAC 154, it starts the transmission of the DMA data onto the parallel bus 17 (step S110). Also, the CPU 151 issues the power-saving mode cancel informing signal to the power-saving controlling portion 144 and shifts to the normal transfer mode (step S111)

Then, it will be explained hereunder at what mode the communication control is executed between the host computer 20 as the upper system and the print controlling portion 12 based on the communication control information at the time of return from the power-saving mode to the normal transfer mode.

Figure 3:
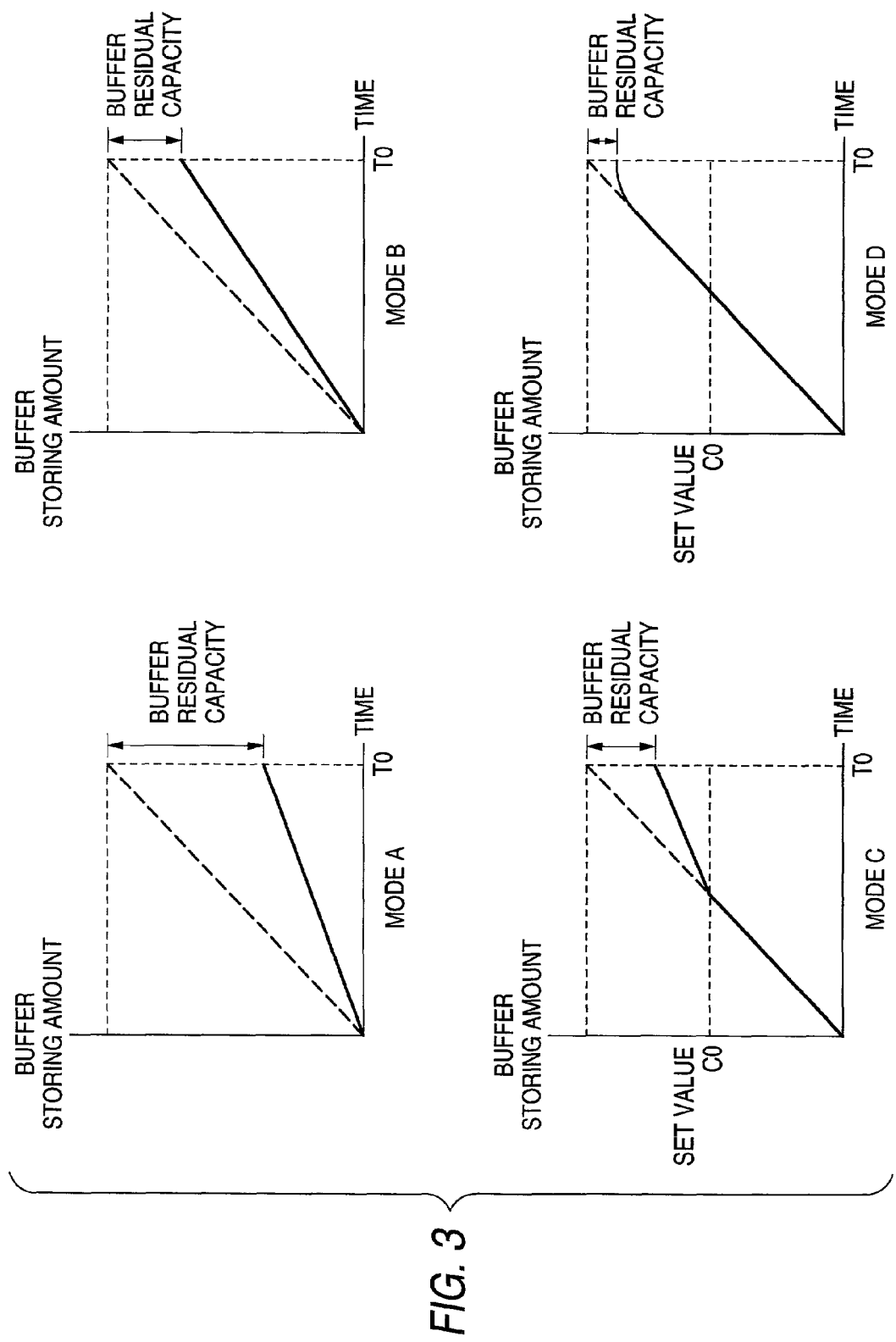
FIG. 3 are views showing an example of a relationship between a communication time between a host computer and a print controlling portion and a buffer storing amount every mode respectively.

FIG.3 shows an example of a relationship between a communication time between the host computer 20 and the print controlling portion 12 during the communication in communication controlling modes based on the communication control information, i.e., mode A, mode B, mode C, and mode D, and an amount of data stored in the buffer storing portion 145, respectively.

As described above, the communication control information indicate a predictive time T0 required until the process in the print controlling portion 12 can be started after the CPU 151 returns from the power-saving mode to the normal transfer mode and complete the boot process, a storing amount of the buffer storing portion 145 (referred simply to as a "buffer storing amount" hereinafter), the maximum data payload form the host computer 20 per one packet, reply rates of the ACK response and the NAK response to the data received from the host computer 20, etc.

In the mode A in FIG.3, when a time comes up to the predictive time T0 required until the process in the print controlling portion 12 can be started after the CPU 151 returns from the power-saving mode and completes the boot process, the buffer storing amount is small. The communication control in this mode A can be implemented by setting low either the maximum data payload form the host computer 20 per one packet or the reply rates of the ACK response and the NAK response to the data received from the host computer 20, in order to lower the predictive time T0 required until the process in the print controlling portion 12 can be started after the CPU 151 returns from the power-saving mode and completes the boot process and the receiving speed.

At this time, the maximum data payload and the reply rates of the ACK response and the NAK response to the received data may be lowered at the same time. The communication control in this mode A is suitable for the communication that has the relatively low emergency, like the cases where the process in the print controlling portion 12 cannot be started because other process is started after the CPU 151 returns from the power-saving mode and completes the boot process, etc.

In the mode B in FIG.3, when the time reaches the predictive time T0 required until the process in the print controlling portion 12 can be started after the CPU 151 returns from the power-saving mode and completes the boot process, the buffer storing amount is large. The communication control in this mode B can be implemented by setting high either the maximum data payload from the host computer 20 per one packet or the reply rates of the ACK response and the NAK response to the data received from the host computer 20, in order to increase the predictive time T0 required until the process in the print controlling portion 12 can be started after the CPU 151 returns from the power-saving mode to complete the boot process, and the receiving speed.

At this time, the maximun data payload and the replay rates of the ACK response and the NAK response to the received data may be set higher at the same time. The communication control in this mode B is suitable for the communication that has the relatively high emergency, like the cases where the process in the print controlling portion 12 can be started immediately because other process is not started after the CPU 151 returns from the power-saving mode and completes the boot process, etc.

In the mode C in FIG. 3, the predictive time T0 required until the process in the print controlling portion 12 can be started after the CPU 151 returns from the power-saving mode to complete the boot process, and a buffer storing amount set value Co are set. Then, such a communication control is carried out that the print data is received normally before the buffer storing amount reaches the buffer storing amount set value Co while an amount of the received data is reduced into a predetermined level after the buffer storing amount has reached the buffer storing amount set value Co.

In the mode D in FIG. 3, the predictive time T0 required until the process in the print controlling portion 12 can be started after the CPU 151 returns from the power-saving mode to complete the boot process, and a buffer storing amount set value Co are also set. Then, such a communication control is carried out that the print data is received normally before the buffer storing amount reaches the buffer storing amount set value Co while an amount of the received data is reduced gradually after the buffer storing amount has reached the buffer storing amount set value Co.

The communication control in the mode C and the mode D can be implemented by setting high either the maximum data payload from the host computer 20 per one packet or the reply rates of the ACK response and the NAK response to the data received from the host computer 20, in order to increase the buffer storing amount set value Co, that acts as a switching point to switch the predictive time T0 required until the process in the print controlling portion 12 can be started after the CPU 151 returns from the power-saving mode and completes the boot process and the receiving speed, and the receiving speed.

At this time, the maximum data payload and the reply rates of the ACK response and the NAK response to the received data may be increased simultaneously. The communication control in the mode C and the mode D is suitable for the communication that has the relatively high emergency, like the cases where the ordinary data receiving speed is not reduced as much as possible and also the process in the print controlling portion 12 can be started immediately because other process is not started after the CPU 151 returns from the power-saving mode and completes the boot process, etc.

As for the set values in the above communication control information, a predetermined value may be set every time when the CPU 151 shifts to the power-saving mode, otherwise a variable value may be set in response to the history made prior to the shift to the power-saving mode, etc. when the CPU 151 shifts to the power-saving mode.

Figure 2:
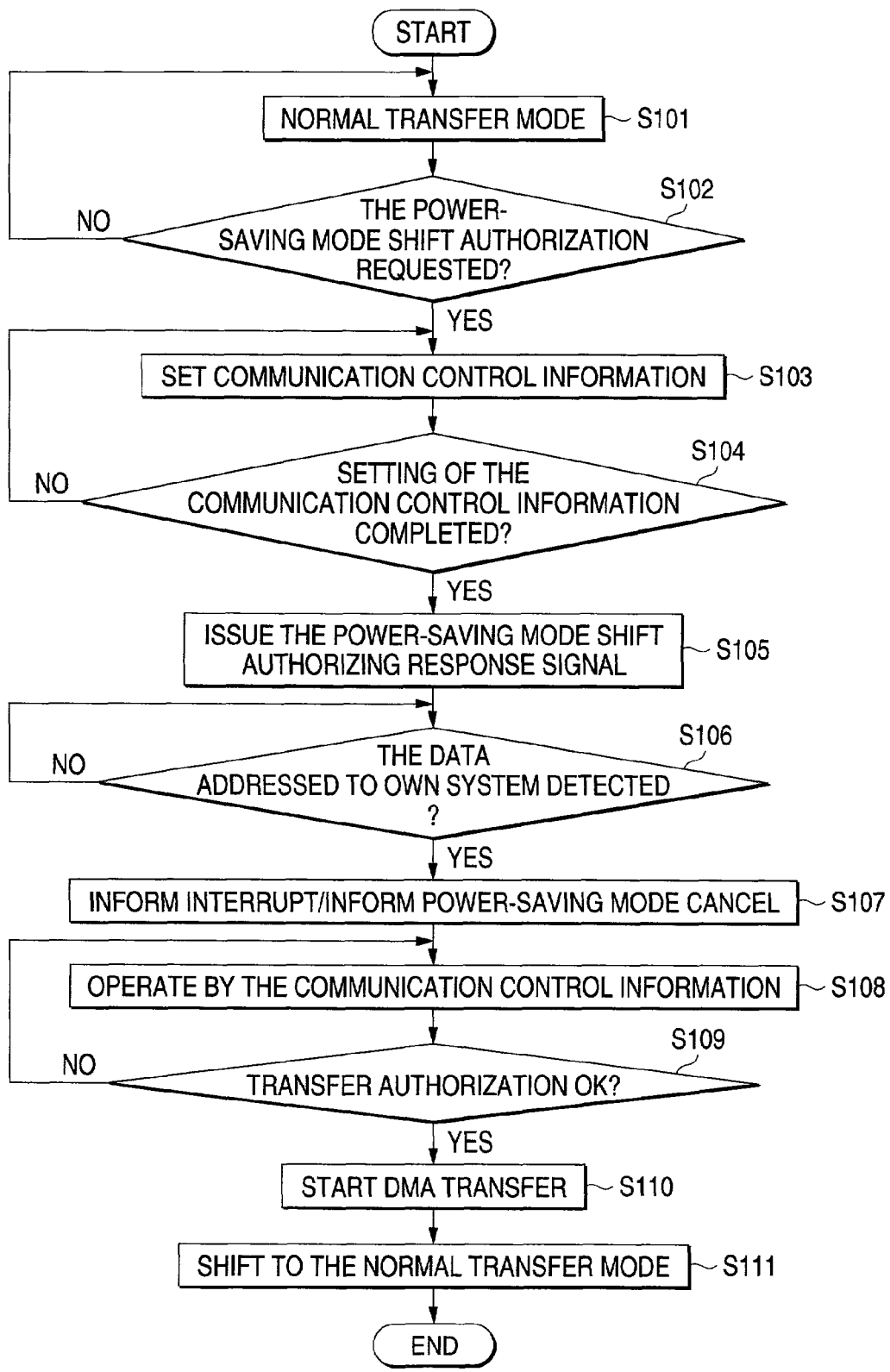
FIG. 2 is a flowchart for explaining an operation of the printing system according to the first embodiment.

In this case, although the explanation is omitted from the flowchart in FIG. 2, it is needless to say that the print controlling portion 12 of the printing system 10 operates while always monitoring the information of the suspend command and the resume command from the host computer 20.

As described above, in the printing system 10 connected to the host computer 20 as the upper system via the serial bus, the communication control information used in the shift from the power-saving mode to the normal transfer mode are set previously in the response controlling portion 147 before the CPU 151 in the print controlling portion 12 shifts to the power-saving mode, and then the response controlling portion 147 executes the data transmission/reception based on the set communication control information in the cancel of the power-saving mode. As a result, after the cancel of the power-saving mode, the normal communication with the host computer 20 can be carried out continuously without the intervention of the CPU 151. In other words, the CPU 151 executes preferentially the boot process immediately after the cancel of the power-saving mode, but the communication with the upper system can be carried out during this processing period.

Also, if the information are transmitted from the host computer 20 to the printing system 10, it is decided whether or not the information is addressed to own system by referring to the address area in the packet, and then the CPU 151 is started by informing the power-saving controlling portion 144 in the print controlling portion 12 of the interruption only when the information is addressed to own system. Therefore, the start of the CPU 151 can be executed speedy and reduced to the lowest minimum.

In addition, the receiving speed of the data from the host computer 20 is decided based on the return time from the power-saving mode to the normal transfer mode and the buffer storing amount, then the data are received based on this decided receiving speed at the time of return, and then the data are stored in the buffer storing portion 145 under the control of the data-storing controlling portion 146. Therefore, the receiving speed can be set on the host computer 20 side not to generate the host time-out error. As a result, after the cancel of the power-saving mode, the generation of the time-out error in the host computer can be prevented without the intervention of the CPU 151, and thus the flexible communication control can be carried out.

Second Embodiment

Figure 4:
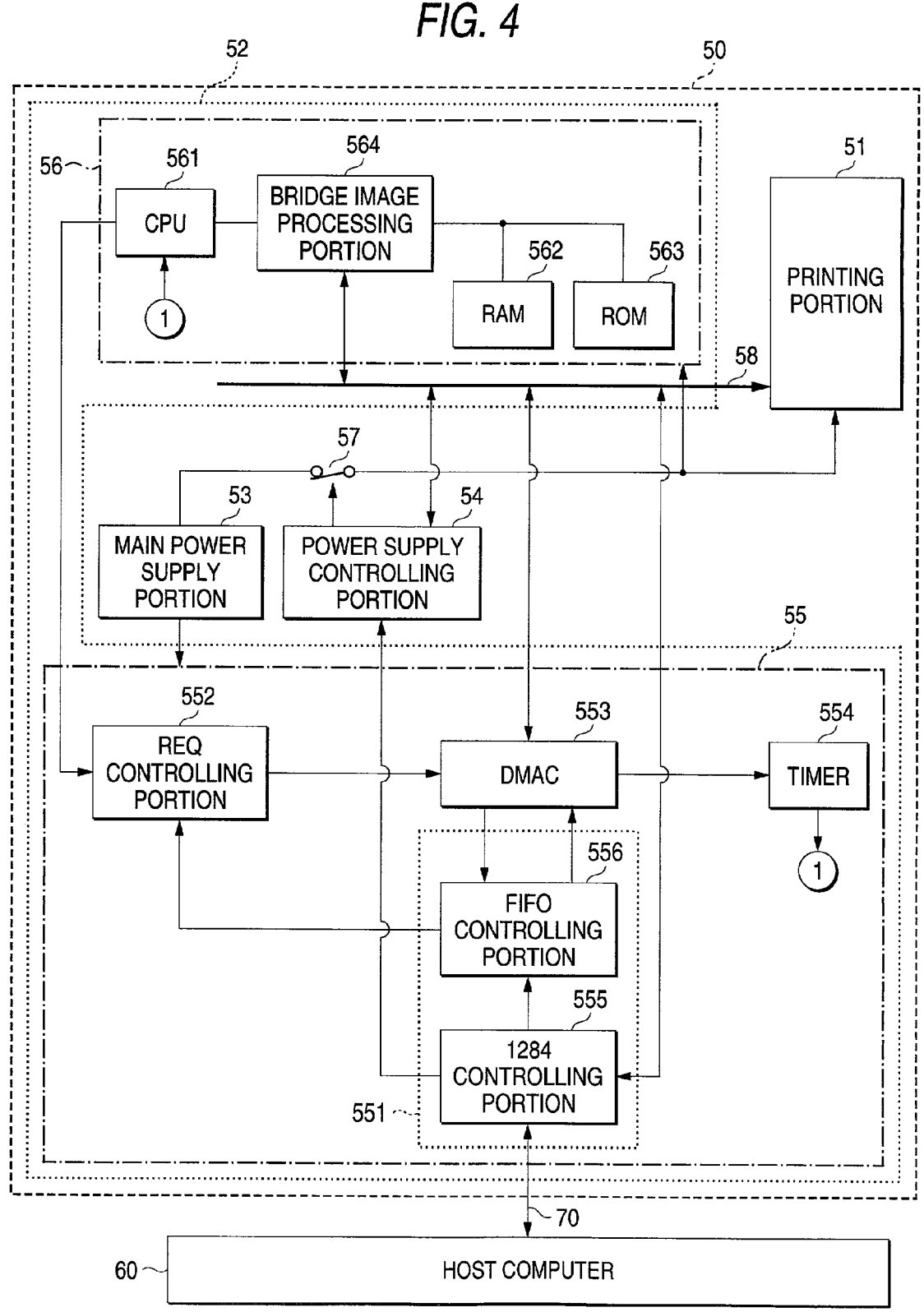
FIG. 4 is a block diagram showing an outline of a configuration of a printing system according to a second embodiment of the present invention.

FIG. 4 is a block diagram showing an outline of a configuration of a printing system according to a second embodiment of the present invention. In FIG. 4, a printing system 50 according to the present embodiment is constructed such that such printing system comprises a printing portion 51, a print controlling portion 52, a main power supply portion 53, and a power supply controlling portion 54, and is connected to a host computer 60 as the upper system, for example, via a parallel bus 70 to transmit/receive the parallel data to/from the host computer 60.

The print controlling portion 52 is constructed such that such print controlling portion has a communication I/F 55 for executing the communication with the host computer 60 via a parallel bus 70, and a controlling portion 56 for controlling the overall present system, and the power source is directly supplied from the main power supply portion 53 to the communication I/F 55, and also the power source is selectively supplied to the printing portion 51 and the controlling portion 56 via a power supply switch 57.

In this print controlling portion 52, the communication I/F 55 is constructed to have a 1284 interface 551, a REQ controlling portion 552, a DMAC 553, and a timer 554 and to respond to various communication standards. The 1284 interface 551 consists of a 1284 controlling portion 555 and a FIFO (first-in first-out) controlling portion 556, and executes the communication control based on IEEE (The Institute of Electrical and Electronics Engineers, Inc.) 1284 standard that can achieve the illustrated high-speed parallel transfer, for example.

The communication interface is not limited to the 1284 interface 551, and the USB (Universal Serial Bus) interface, the LAN (Local Area Network) interface (100BT interface), etc. may be employed. Also, the system in which the interface is connected simultaneously to the upper system, i.e., the host computer 60, may be employed.

In the situation that the HALT (halt) state signal output from the CPU 561 in the controlling portion 56 indicates the normal transfer mode, when the data transfer requesting signal is output from the 1284 interface 551, the REQ controlling portion 552 outputs the data transfer requesting signal to the DMAC 553. The DMAC 553 executes the DMA transfer in response to this data transfer requesting signal. The timer 554 monitors the DMA transfer requesting signal output from the DMAC 553, then counts a negate period of the DMA transfer request, i.e., a period during when the DMA transfer requesting signal is not output, and then outputs a time-out interrupt signal to the CPU 561 when this count value comes up to a predetermined value that is decided previously.

The controlling portion 56 is constructed such that such controlling portion has the CPU 561, a RAM 562, a ROM 563, and a bridge image processing portion 564, and the bridge image processing portion 564 is connected mutually to the printing portion 51, the power supply controlling portion 54, and the communication I/F 55 via an internal bus 58. The program executed in the CPU 561, etc. are stored in the ROM 563. The clock is supplied to the power supply controlling portion 54 from an oscillator (not shown), and also the receiving interrupt signal is input into the power supply controlling portion 54 from the communication I/F 55. The power supply controlling portion 54 supplies the clock supplied from the oscillator as it is to the CPU 561 and the bridge image processing portion 564 in the controlling portion 56 or supplies the masked clock to them.

In the printing system 50 having the above configuration according to the second embodiment, the transmission data from the host computer 60 as the upper system is input into the DMAC 553 via the 1284 interface 551. When the DMAC 553 receives the reception data, it transmits the DMA transfer requesting signal to the bridge image processing portion 564 via the internal bus 58 and also outputs the input data onto the internal bus 58. The data being output onto the internal bus 58 is transferred to the RAM 562 as a main memory via the bridge image processing portion 564. The data being DMA-transferred to the RAM 562 is subjected to the image process by the CPU 561, and then output to the printing portion 51 via the bridge image processing portion 564.

Figure 5:
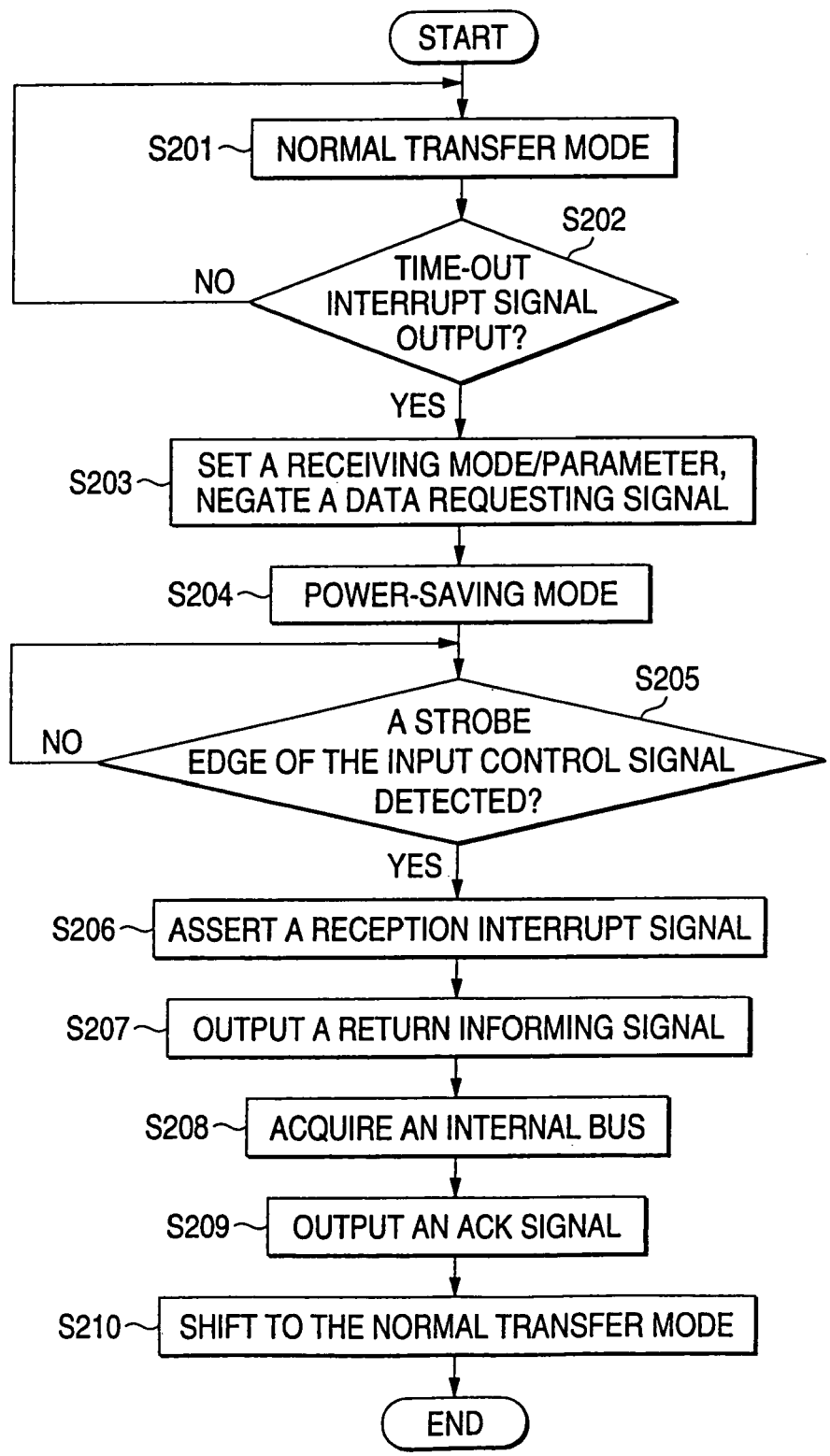
FIG. 5 is a flowchart for explaining an operation of the printing system according to the second embodiment.

Then, an operation in shifting the mode from the power-saving mode to the normal transfer mode will be explained in compliance with a flowchart in FIG. 5 hereunder.

First, when the power supply of the printing system 50 is turned ON, the power supply controlling portion 54 supplies the power source to the controlling portion 56 and enters into the normal transfer mode (step S201). In this normal transfer mode, when the data reception is started via the 1284 interface 551, the DMA transfer is carried out by the above operation. When the data reception is completed but the subsequent data is not received, the timer 554 is started. If the subsequent DMA transfer requesting signal is not asserted within a predetermined time, i.e., if the DMA transfer is not carried out between the DMAC 553 and the RAM 562 for the predetermined time, a time-out interrupt signal is output from the timer 554 to the CPU 561 (step S202)

When the CPU 561 receives the time-out interrupt signal, such CPU 561 sets the communication control information used in the shift from the power-saving mode to the normal transfer mode (referred to as a "receiving mode/parameter" hereinafter) in the 1284 controlling portion 555 in the 1284 interface 551, and also informs the REQ controlling portion 552 of the effect that the controlling portion 56 is shifted into the power-saving mode and thus the DMA transfer cannot be executed, and negates the data requesting signal to the DMAC 553 (step S203).

Then, the CPU 561 outputs the power supply OFF informing signal to the power supply controlling portion 54 via the bridge image processing portion 564 such that the power source supply to the controlling portion 56 can be stopped. Then, the power supply controlling portion 54 turns OFF (opens) the power supply switch 57 in response to the power supply OFF informing signal. Accordingly, the power supply to the controlling portion 56 is stopped and the system is shifted into the power-saving mode (step S204) At this time, the power supply is still supplied continuously to the communication I/F 55.

The shift from the power-saving mode to the normal transfer mode is carried out according to following procedures. In other words, when the 1284 controlling portion 555 in the 1284 interface 551 received the data after this data is transmitted from the host computer 60, such 1284 controlling portion 555 detects a change in the input control signal (a leading edge of the strobe signal) (step S205) and asserts the reception interrupt-signal to the power supply controlling portion 54 (step S206). At this time, the power supply controlling portion 54 receives this reception interrupt signal to turn ON the power supply switch 57. Accordingly, the power source supply to the controlling portion 56 is started again, and the CPU 561 starts the boot process (building-up process).

The CPU 561 outputs a return informing signal to the REQ controlling portion 552 when the boot process is completed (step S207) and sets the normal transfer mode in the 1284 controlling portion 555 in the 1284 interface 551. Thus, the DMA transfer is restarted. More particularly, the REQ controlling portion 552 receives the return informing signal from the CPU 561 and asserts the data requesting signal to the DMAC 553. In response to this, the DMAC 553 adjusts the DMA transfer requests from other modules and requests the acquirement of the internal bus 58 by outputting the DMA transfer requesting signal to the CPU 561 (step S208).

Then, when the DMAC 553 can acquire the internal bus 58, it outputs the ACK signal to the FIFO controlling portion 556 in the 1284 interface 551 and also outputs the DMA transfer requesting signal to the timer 554 (step S209). Thus, the timer 554 is reset. Also, the FIFO controlling portion 556 receives the ACK signal and outputs the stored data to the DMAC 553. Accordingly, the DMA transfer is carried out between the DMAC 553 and the RAM 562. That is, the mode is shifted into the normal transfer mode (step S210).

In a series of above procedures, the case of the power-saving mode where the power supply controlling portion 54 stops the power source supply to the controlling portion 56 is described as an example. In the case of the power-saving mode (sleep mode) where the power supply controlling portion 54 also stops the clock supply to the controlling portion 56, the process can be carried out in compliance with the similar procedures.

In this case, in setting the receiving mode/parameter in the above power-saving mode, the lowest receiving data buffer capacity is reserved as the system based on the previously decided returning time from the power-saving mode to the normal transfer mode in the present printing system 50 and the time-out setting time of the host system. If the storing buffers (memories) are present in the FIFO controlling portion 556 and the 1284 controlling portion 555, the receiving data buffer capacity used herein is given as a sum of both buffer capacities.

Figure 6:
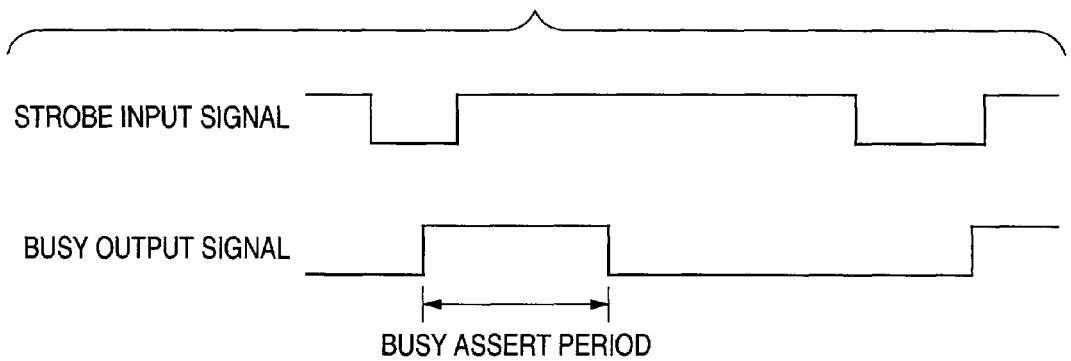
FIG. 6 is a timing chart showing a basic handshake of a parallel interface.

The data reception to meet the return time can be carried out without fail by using the reception parameter (receiving speed) set herein. More particularly, a busy assert period shown in FIG. 6 is adjusted in the parallel interface based on 1284. The assert time can be implemented relatively easily if it is set constant by the register, as described above.

Figure 7:
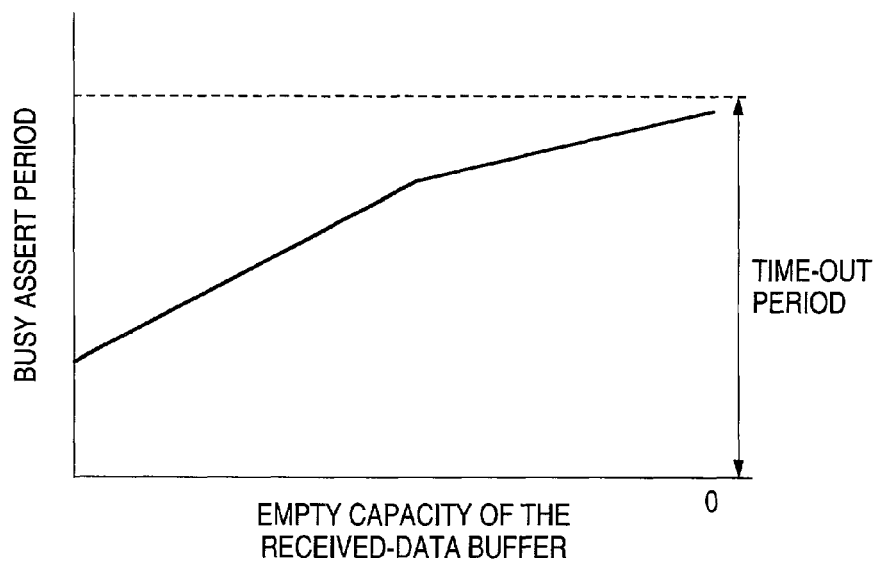
FIG. 7 is a view showing an example of a relationship between a received-data buffer empty capacity and a busy assert period.

In addition, as shown in FIG. 7, the assert time can be decided dynamically from a residual amount of the received-data buffer capacity. Accordingly, in the transition period from the power saving mode to the normal transfer mode, the busy signal is asserted per one data reception for a time set by the 1284 controlling portion 555. Therefore, if the reception (handshake) is continued at the data receiving speed that is below the time-out period of the host system until a time required to return from the power saving mode has lapsed, the state that the received-data buffer capacity is filled to assert busy can be avoided.

Also, since the shift from the power saving mode to the normal transfer mode, i.e., the decision of the cancel of the power saving mode is started by detecting the change of the input control signal in the parallel interface (leading edge of the strobe signal), the power saving mode can be canceled to respond the inquiry immediately when the inquiry, i.e., the transmission request, is issued from the upper system (host computer 60) to the present printing system 50 in the power saving mode. As shown in FIG. 8, this is because the strobe signal is changed in a negotiation phase based on IEEE1284 standard and thus the interrupt signal can be asserted by the above edge detecting portion.

As described above, in the printing system 50 connected to the host computer 60 as the upper system via the parallel bus, the data can be received based on the previously-set communication control information without the CPU 561 immediately after the shift from the power saving mode to the normal transfer mode. Therefore, it is possible to receive the data within the returning time from the power saving mode not to generate the time-out error in the upper system side. As a result, the mode can be returned to the normal transfer mode not to lower extremely the data transfer efficiency. That is, the FPOT that is most suitable for the present printing system 50 can obtained.

In addition, since the decision of the cancel of the power saving mode is made by detecting the change of the input control signal line in the parallel interface, the mode can be shifted into the normal transfer mode by immediately canceling the power saving mode even when not only the data is to be received but also the inquiry, i.e., the transmission request, is issued from the upper system (host computer 60) to the present printing system 50 in the power saving mode.

EFFECTS OF THE INVENTION

As described above, according to the present invention, in the shift from the power-saving mode to the normal mode, the generation of time-out error on the upper system side can be avoided and also the FPOT can be optimized.

What is claimed is:

1. An image forming apparatus having a power save mode and a normal mode, the image forming apparatus comprising:
    an image forming portion that outputs an image corresponding to data received from an external device being located outside of the image forming apparatus;
    a controller that controls the image forming portion to output the received data after a period of transition from the power save mode to the normal mode, the controller including a processor, the processor being in an off-state in the power save mode and being in an on-state in the normal mode to control the image forming portion; and
    a communication interface that receives the data from the external device and that controls a speed for receiving the data during the period of transition,
    wherein, in the power save mode, the processor is in the off state and the communication interface is active,
    the communication interface receives the data and controls the speed for receiving the data during the period of transition, and a period when the processor is in the off-state,
    the controller further, before going into an off-state, sets information in the communication interface for controlling the speed for receiving the data, and
    the communication interface further controls the speed for receiving the data based on the information set by the controller.

2. The image forming apparatus according to claim 1, wherein the communication interface further controls the speed for receiving the data based on a predictive time length of the period set in the communication interface.

3. The image forming apparatus according to claim 1, further comprising a storing portion that stores the received data, wherein the communication interface further controls the speed for receiving the data based on a residual capacity of the storing portion.

4. The image forming apparatus according to claim 1, wherein the communication interface further controls the speed for receiving the data based on information indicating a maximum data payload to be received from the external device, the information being set in the communication interface.

5. The image forming apparatus according to claim 1, wherein the communication interface further controls the speed for receiving the data based on information indicating a reply rate of ACK response and NAK response to the external device, the information being set in the communication interface.

6. The image forming apparatus according to claim 1, wherein:
    the image forming apparatus is coupled to the external device via a serial bus; and
    the communication interface further decides whether or not the data including a packet is directed to the image forming apparatus, by referring an address area in the packet, and responds to the data being addressed to the image forming apparatus when the information is transmitted from the external device via serial communication.

7. The image forming apparatus according to claim 1, wherein:
    the image forming apparatus is coupled to the external device via a serial bus; and
    the communication interface further decides a mode shift by detecting change of an input control signal of a parallel interface, the mode shift including a shift from or to the normal mode.

8. The image forming apparatus according to claim 1, wherein:
    the image forming apparatus is coupled to the external device via a serial bus; and
    the communication interface further decides the speed for receiving the data based on a setting of a data payload in a packet in receiving serial data from the external device.

9. The image forming apparatus according to claim 1, wherein:
    the image forming apparatus is coupled to the external device via a serial bus; and
    the communication interface further decides the speed for receiving the data based on a rate of (1) notices informing that reception is normally completed, and (2) notices informing that reception is not normally completed, in replying to the data received from the external device.

10. The image forming apparatus according to claim 1, wherein the communication interface receives the data and controls the speed for receiving the data during the period of transition and a period of when the processor is in a boot-processing state.

* * * * *